(12) United States Patent
Huang et al.

(10) Patent No.: US 10,984,059 B2
(45) Date of Patent: Apr. 20, 2021

(54) DATA RETRIEVAL METHOD AND SYSTEM

(71) Applicant: TENCENT TECHNOLOGY (SHENZHEN) COMPANY LIMITED, Shenzhen (CN)

(72) Inventors: Bin Huang, Shenzhen (CN); Xun Luo, Shenzhen (CN); Jianchen Zhu, Shenzhen (CN); Min Luo, Shenzhen (CN); Shanmin Tang, Shenzhen (CN); Yongsheng Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 286 days.

(21) Appl. No.: 15/949,796

(22) Filed: Apr. 10, 2018

(65) Prior Publication Data

US 2018/0232452 A1    Aug. 16, 2018

Related U.S. Application Data

(63) Continuation of application No. PCT/CN2017/081357, filed on Apr. 21, 2017.

(30) Foreign Application Priority Data

Apr. 22, 2016 (CN) .......................... 201610257637.8

(51) Int. Cl.
*G06F 16/9535* (2019.01)
*G06F 16/22* (2019.01)
(Continued)

(52) U.S. Cl.
CPC .......... *G06F 16/9535* (2019.01); *G06F 16/22* (2019.01); *G06F 16/955* (2019.01); *G06Q 30/0201* (2013.01); *G06Q 50/01* (2013.01)

(58) Field of Classification Search
CPC ............... G06F 16/9535; G06F 3/0482; G06F 11/3438; G06F 16/735; G06F 40/134;
(Continued)

(56) References Cited

U.S. PATENT DOCUMENTS

2008/0126476 A1\* 5/2008 Nicholas ................ G06Q 10/10
709/203
2011/0258049 A1\* 10/2011 Ramer ............... G06Q 30/0273
705/14.66
(Continued)

FOREIGN PATENT DOCUMENTS

CN    101589388    11/2009
CN    101977223    2/2011
(Continued)

OTHER PUBLICATIONS

Office Action dated Jun. 5, 2019 in Chinese Patent Application No. 201610257637.8. (With English Abstract) p. 1-7.
(Continued)

*Primary Examiner* — Angelica Ruiz
(74) *Attorney, Agent, or Firm* — Oblon, McClelland, Maier & Neustadt, L.L.P.

(57) ABSTRACT

A method for data retrieval is described. Interface circuitry of an information processing apparatus receives a request for data retrieval from a database. The database stores content sharing information in a social network. The request includes a first user identifier and a first link identifier. The processing circuitry determines whether the first user identifier and the first link identifier are associated in the database as a consequence of a previous sharing of a first article corresponding to the first link identifier using the first user identifier. Further, when the first user identifier and the first link identifier are determined to be associated, the processing circuitry searches for a first message identifier in the database. The first message identifier identifies a first mes-
(Continued)

sage that includes information of the previous sharing of the first article. The processing circuitry then retrieves the first message according to the first message identifier.

18 Claims, 5 Drawing Sheets

(51) Int. Cl.
  *G06F 16/955* (2019.01)
  *G06Q 30/02* (2012.01)
  *G06Q 50/00* (2012.01)
(58) Field of Classification Search
  CPC .. G06F 16/9537; G06F 3/04847; G06F 16/13; G06F 16/9566; G06F 16/248; G06F 16/951; G06F 16/9577; G06F 16/972; G06F 21/34
  USPC ........... 707/600–831, 899, 999.001–999.206
  See application file for complete search history.

(56) References Cited

U.S. PATENT DOCUMENTS

| | | | |
|---|---|---|---|
| 2012/0036181 A1* | 2/2012 | Isidore | H04L 67/18 709/203 |
| 2013/0073400 A1* | 3/2013 | Heath | G06F 16/29 705/14.73 |
| 2013/0215116 A1* | 8/2013 | Siddique | G06Q 20/204 345/420 |
| 2015/0180980 A1* | 6/2015 | Welinder | H04L 67/06 715/758 |
| 2016/0063100 A1* | 3/2016 | Anton | G06F 16/2219 707/739 |
| 2016/0078659 A1* | 3/2016 | Bartkiewicz | G06Q 50/01 715/771 |

FOREIGN PATENT DOCUMENTS

| | | |
|---|---|---|
| CN | 102521253 | 6/2012 |
| CN | 102799693 | 11/2012 |
| CN | 103034706 | 4/2013 |
| CN | 104639593 | 5/2015 |
| CN | 105100223 | 11/2015 |
| JP | H11351896 | 12/1999 |

OTHER PUBLICATIONS

International Preliminary Report on Patentability dated Oct. 23, 2018 in PCT/CN2017/081357 filed Apr. 21, 2017. p. 1-5.
Written Opinion of the International Searching Authority dated Jul. 28, 2017 in PCT/CN2017/081357 filed Apr. 21, 2017. (With English Translation) p. 1-8.
International Search Report dated Jul. 28, 2017 in PCT/CN2017/081357 filed Apr. 21, 2017. (With English Translation).

* cited by examiner

DATA RETRIEVAL METHOD AND SYSTEM

RELATED APPLICATION

This application is a continuation of International Application No. PCT/CN2017/081357, filed on Apr. 21, 2017, which claims priority to Chinese Patent Application No. 201610257637.8, entitled "DATA RETRIEVAL METHOD AND SYSTEM" filed with the Chinese Patent Office on Apr. 22, 2016. The entire disclosures of the prior applications are hereby incorporated by reference in their entirety.

FIELD OF THE TECHNOLOGY

This application relates to the field of information processing technologies, and in particular, to a data retrieval method and system.

BACKGROUND OF THE DISCLOSURE

A related social network system (such as, a WeChat system and an instant messaging system) each has a retrieval function of a relationship link. Specifically, the social network system may retrieve a sharing situation of an article of a link by a friend of a user according to a keyword input by the user, and show the sharing situation to the user.

The related social network system usually uses a good object (Good Object, GOB for short) retrieval system to implement the foregoing retrieval function. Specifically, the social network system stores a relationship between the user and the shared article in an inverted data structure from a term to a message identity. In this way, when retrieving information about the article shared by the user, the social network system uses a user identity and a link identity as the terms, respectively searches for and obtains a first list and a second list of a message identity corresponding to the user identity and the link identity, and then performs an intersection operation on the first list and the second list to obtain correspondence of the link identity, the user identity and the message identity. Because the intersection operation is to be performed on the first list and the second list, if the number of terms of the two lists is relatively great, the calculation amount of data retrieval is relatively great.

SUMMARY

This application provides a data retrieval method and system, implementing directly finding a message identity in a correspondence list stored by the data retrieval system.

A method for data retrieval is described. The interface circuitry of an information processing apparatus receives a request for data retrieval from a database. The database stores content sharing information in a social network. The request includes a first user identifier and a first link identifier. The processing circuitry of the information processing apparatus determines whether the first user identifier and the first link identifier are associated in the database as a consequence of a previous sharing of a first article corresponding to the first link identifier using the first user identifier. Further, when the first user identifier and the first link identifier are determined to be associated in the database, the processing circuitry searches for a first message identifier in the database. The first message identifier identifies a first message that includes information of the previous sharing of the first article corresponding to the first link identifier using the first user identifier. The processing circuitry then retrieves the first message according to the first message identifier.

In some embodiments, the request includes a plurality of user identifiers. The processing circuitry uses filters corresponding to link identifiers to filter out a subset of user identifiers from the plurality of user identifiers. The subset of user identifiers is not associated with any of the link identifiers in the database. Then, the processing circuitry searches for the first message identifier when the first user identifier is not in the subset of user identifiers that has been filtered out.

In an example, the filters are stored a filter file. A filter in the filter file includes a filter index field and a filter value field. The filter index field includes a corresponding link identifier to the filter and an offset of the filter in the filter file. The filter value includes a plurality of data blocks that respectively include a data length and filtering policy data.

In an example, the interface circuitry receives a sharing request to share a second article that is identified by a second link identifier. The sharing request includes a second user identifier that is used by a user who sends the sharing request. The processing circuitry stores information of a sharing of the second article using the second user identifier in a second message. The second article is identified by the second link identifier in the second message. Further, the processing circuitry generates a second message identifier for identifying the second message and associates the second link identifier with the second user identifier in the database. In an embodiment, the processing circuitry then stores the second link identifier in association with the second message identifier in the database. In another embodiment, the processing circuitry stores the second user identifier in association with the second message identifier in the database.

An apparatus for data retrieval is described. The apparatus includes memory circuitry, interface circuitry and processing circuitry. The memory circuitry is configured to store a database that stores content sharing information in a social network. The interface circuitry is configured to receive a request for data retrieval from the database. The request includes a first user identifier and a first link identifier. The processing circuitry is configured to determine whether the first user identifier and the first link identifier are associated in the database as a consequence of a previous sharing of a first article corresponding to the first link identifier using the first user identifier. When the first user identifier and the first link identifier are determined to be associated in the database, the processing circuitry is configured to search for a first message identifier in the database. The first message identifier identifies a first message that includes information of the previous sharing of the first article corresponding to the first link identifier using the first user identifier. The processing circuitry then retrieves the first message according to the first message identifier.

According to a technical solution of this application, in the data retrieval system, correspondence of the link identity or the user identity and the message identity is stored by using the correspondence list. In this way, in the data retrieval system, to determine that the link identity and the user identity in the data retrieval request are associated with each other, directly find the message identity corresponding to the link identity or the user identity in the correspondence list, thereby obtaining a situation where a user shares the article. In the solution provided in this application, an intersection operation may be not performed, and a final result may be directly searched for and obtained. Compared with the intersection operation in the related technology, the calculation amount of data retrieval is less.

BRIEF DESCRIPTION OF THE DRAWINGS

To describe the technical solutions in embodiments of this application or in the related technology more clearly, the following briefly describes the accompanying drawings required for describing the embodiments or the related technology. The accompanying drawings in the following description show merely some embodiments of this application, and a person of ordinary skill in the art may still derive other drawings from these accompanying drawings.

DESCRIPTION OF EMBODIMENTS

The following clearly and completely describes the technical solutions in embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application shall fall within the protection scope of this application.

Terms, namely, "first", "second", "third", "fourth", and the like (if existing), in the specification, claims, and the foregoing drawings of this application are used for distinguishing between similar objects, but are not necessarily used to describe a specific sequence or a precedence order. It is understood that data used in this way can be exchanged in a proper circumstance, so that the embodiments of this application can be implemented in other orders except those shown in the figures or described herein. Moreover, the terms "include", "contain" and any other variants mean to cover the non-exclusive inclusion. For example, a process, method, system, product, or device that includes a series of steps or units is not necessarily limited to those steps or units, but may include other steps or units not expressly listed or inherent to such a process, method, product, or device.

Figure 1:
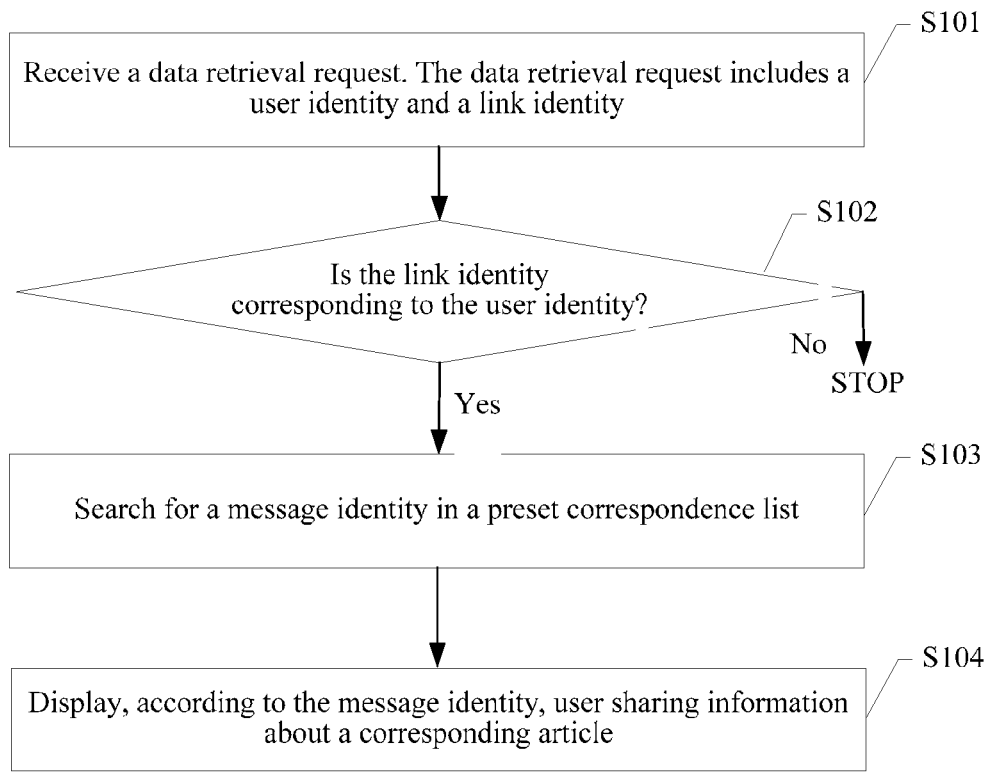
FIG. 1 is a flow chart of a data retrieval method according to an embodiment of this application.

According to an embodiment of this application, a data retrieval method is provided, which is mainly applied in a social network system, for example, a WeChat system, a microblog system, or an instant messaging system (such as, a QQ system). The social network system may include a client and a server. A data retrieval system is loaded in the server. The method of this embodiment is a method performed by the data retrieval system of the server. A flow chart of the method is as shown in FIG. 1, and the method includes:

Step S101: Receive a data retrieval request. The data retrieval request includes a user identity (e.g., identifier) and a link identity. The user identity herein is information that uniquely identifies a user, for example, a WeChat account, a microblog account or an instant messaging account, and the link identity is information that uniquely identifies a link to an article.

It may be understood that the user may initiate a data retrieval procedure by using the client included in the social network system. Specifically, the user may select at least one link to an article on a search interface displayed by the client, and may select a user identity of the user, and/or, at least one user identity related to the user, to initiate the data retrieval request, and add information selected by the user in the data retrieval request. In this way, the data retrieval system of the server receives the data retrieval request sent by the client, and performs the following steps S102 to S104. The numbers of user identities and link identities in the data retrieval request may respectively be one, or respectively be plurality.

Step S102: Determine whether a link identity is corresponding to (e.g., in association with) a user identity, if yes, perform step S103, meaning that a user corresponding to the user identity shares an article of a link identified by the link identity by using a client; if no, end the procedure. Determine that the link identity is corresponding to the user identity, if the link identity is included in a link identity corresponding to the user identity, or the user identity is included in a user identity corresponding to the link identity.

Step S103: Search for a corresponding message identity in a preset correspondence list (e.g., database that associates message identifiers with link identifiers or associates message identifiers with user identifiers).

Step S104: Display, according to the message identity, user sharing information about a corresponding article. The user sharing information may specifically include review information of a user, the number of users sharing the article, and so on. The user sharing information can be displayed at the server or can be transmitted from the server to a client, such as a user terminal to display on the user terminal for example.

It is noted that when a user shares an article of a link by using a client, the data retrieval system of this embodiment receives a sharing request of the user for the article of the link. The sharing request includes a link identity of the link and a user identity of the user, and may further include review information of the user. The data retrieval system stores information about the article of the link into a message corresponding to the user identity, may further store the review information of the user into the message, and generate a message identity of the message to uniquely identify the message. Then store the link identity and the message identity into the correspondence list, and associate the link identity with the user identity; or store the user identity and the message identity into the correspondence list, and associate the user identity with the link identity. Therefore, when performing step S102, the data retrieval system may search whether the link identity that is associated with the user identity in the data retrieval request and that is stored in the data retrieval system includes the link identity in the data retrieval request, or search whether the user identity that is associated with the link identity in the request and that is stored in the data retrieval system includes the user identity in the request, if yes, perform step S103.

The following respectively further describes the method of this application in two cases where a correspondence list (a first correspondence list) includes a link identity and a message identity (example 1) and where a correspondence list (a second correspondence list) includes a user identity and a message identity (example 2).

Embodiment 1

In this example, not only a first correspondence list but also information of a link identity that is associated with a user identity needs to be stored in a data retrieval system. In a specific implementation process:

(1) the first correspondence list may include a plurality of data blocks, and each data block includes a header and a value.

The structure of the header may be as shown in the following Table 1. The header includes a data length and offset data of a next data block in a file, and may further include reserve data. The data length herein is configured to indicate the length of the data block, and the offset data of the next data block in the file is configured to indicate position information of the next data block of the data block.

TABLE 1

| 8 bytes next offset | 8 bytes data length | 16 bytes reserve |
|---|---|---|

The structure of the value of each data block may be as shown in the following Table 2. The value includes a link identity and a corresponding message identity. The link identity may be represented by a document identity (docid for short), and the message identity is represented by a Tweet identity (tid for short). The tid mainly means an identity of a message published by a user by using a client of a social network system, for example, an identity of a microblog message, and an identity of a WeChat message.

TABLE 2

| 8 bytes tid A | 8 bytes docid A | 8 bytes tid B | 8 bytes docid B |
|---|---|---|---|

(2) in this example, the data retrieval system may find the information of the link identity that is associated with the user identity by using a user identity index. The structure of the user identity index may be as shown in the following Table 3. The user identity index includes a user identity and offset data of associated information in a file. Herein the user identity may be represented by a user identification number (uni for short), and the offset data of the associated information in the file is used for representing position information of information about a link identity that is associated with the user identity.

TABLE 3

| 8 bytes uin | 8 bytes offset |
|---|---|

In this example, for step S103, in the preset first correspondence list, search for a message identity corresponding to a link identity in a retrieval request. The first correspondence list includes correspondence of the link identity and the message identity.

In a specific example, to further reduce a workload of data retrieval, if the foregoing data retrieval request includes a plurality of user identities, before performing step S102, the data retrieval system may first use a filter (or filters) to filter the plurality of user identities included in the data retrieval request to filter at least one user identity and obtain a remaining user identity, the filtered user identity being a user identity that is not corresponding to any link identity. In this case, when performing step S102, the data retrieval system determines whether the link identity in the data retrieval request is included in a link identity corresponding to the remaining user identity.

Specifically, data of the filter(s) is stored in a filter file in the data retrieval system, data of a filter may include: a filter index and a filter value.

For example 1, the structure of the filter index may be as shown in the following Table 4. The filter index includes a link identity and offset data of the filter in a file. The offset data of the filter in the file is used for indicating position information of the filter, and a link identity is corresponding to a filter.

TABLE 4

| 8 bytes docid | 8 bytes offset |
|---|---|

The structure of the filter value may be as shown in the following Table 5. The filter value includes a plurality of data blocks. Each data block includes a data length and filtering policy data. The data length is used for indicating the length of filtering policy data, the filtering policy data is policy data that filters the user identity, and may be preset by the user. The filter herein may be a Bloom Filter (BF for short).

TABLE 5

| 4 bytes length | X bytes BF data A | 4 bytes length | X bytes BF data B |
|---|---|---|---|

In addition, it is noted that when the data retrieval system in this example stores the first correspondence list and the information of the link identity that is associated with the user identity, the first correspondence list and the information are all stored in a persistent memory (such as, a magnetic disk) of the data retrieval system, and the data of the filter may be stored in a temporary memory (such as, memory).

It can be learned that during applying the method of this example, in the data retrieval system, the correspondence of the link identity and the message identity is stored by using the first correspondence list. In this way, in the data retrieval system, to determine that the link identity and the user identity in the data retrieval request are associated with each other, directly find the message identity corresponding to the link identity in the first correspondence list, thereby obtaining a situation where a user shares an article of a link. In the method in this embodiment, an intersection operation may be not performed, and a final result may be directly searched for and obtained. Compared with the intersection operation in the related technology, the calculation amount of data retrieval is less.

Embodiment 2

In this example, not only a second correspondence list but also information of a user identity that is associated with a link identity needs to be stored in a data retrieval system. In a specific implementation process:

(1) the second correspondence list may include a plurality of data blocks, and each data block includes a header and a value.

The structure of the header may be as shown in the foregoing Table 1. The header includes a data length and offset data of a next data block in a file, and may further include reserve data. The structure of the value of each data block may be as shown in the following table 6. The value of each data block includes a user identity and a corresponding message identity. The user identity herein may be represented by uin, and the message identity may be represented by tid.

TABLE 6

| 8 bytes tid A | 8 bytes uin A | 8 bytes tid B | 8 bytes uin B |
| --- | --- | --- | --- |

(2) in this example, the data retrieval system may find the information of the user identity that is associated with the link identity by using a link identity index. The structure of the link identity index may be as shown in the following Table 7. The link identity index includes a link identity and offset data of associated information in a file. Herein the link identity may be represented by docid, and the offset data of the associated information in the file is used for representing position information of information about a user identity that is associated with the link identity.

TABLE 7

| 8 bytes docid | 8 bytes offset |
| --- | --- |

In this example, for step S103, in the preset second correspondence list, search for a message identity corresponding to a user identity in a retrieval request. The second correspondence list includes correspondence of the user identity and the message identity.

According to an aspect of this application, to further reduce a workload of data retrieval, if the foregoing data retrieval request includes a plurality of user identities, before performing step S102, the data retrieval system may first use a filter to filter at least one user identity of the plurality of user identities and obtain a remaining user identity, the filtered user identity being a user identity that is not corresponding to any link identity. For example, when performing step S102, the data retrieval system may determine whether the remaining user identity is included in a user identity corresponding to the link identity in the data retrieval request.

Specifically, the structure of the filter in this example may be as the descriptions in the Table 5 in the foregoing example 1, and details are not described herein.

In addition, the structure of the identity index stored in the data retrieval system may be as shown in the following Table 8. The identity index includes a link identity, offset data of associated information in a file and offset data of a filter in a file. Herein the offset data of the filter in the file is used for representing position information of data of a filter corresponding to the link identity. The link identity may be represented by docid, and the offset data of the associated information in the file is used for representing position information of information about a user identity that is associated with the link identity.

TABLE 8

| 8 bytes docid | 8 bytes offset | 8 bytes BF offset |
| --- | --- | --- |

In this case, a position of a corresponding filter may be directly positioned by using the link identity.

In addition, it is noted that when the data retrieval system in this example stores the second correspondence list and the information of the user identity that is associated with the link identity, the second correspondence list and the information are all stored in a persistent memory (such as, a magnetic disk) of the data retrieval system, and the data of the filter may be stored in a temporary memory (such as, memory).

It can be learned that in the method corresponding to this example 2, in the data retrieval system, the correspondence of the user identity and the message identity is stored by using the second correspondence list. In this way, in the data retrieval system, to determine that the user identity and the link identity in the data retrieval request are associated with each other, directly find the message identity corresponding to the user identity in the second correspondence list, thereby obtaining a situation where a user shares an article. In the method in this embodiment, an intersection operation may be not performed, and a final result may be directly searched for and obtained. Compared with the intersection operation in the related technology, the calculation amount of data retrieval is less.

Figure 2:
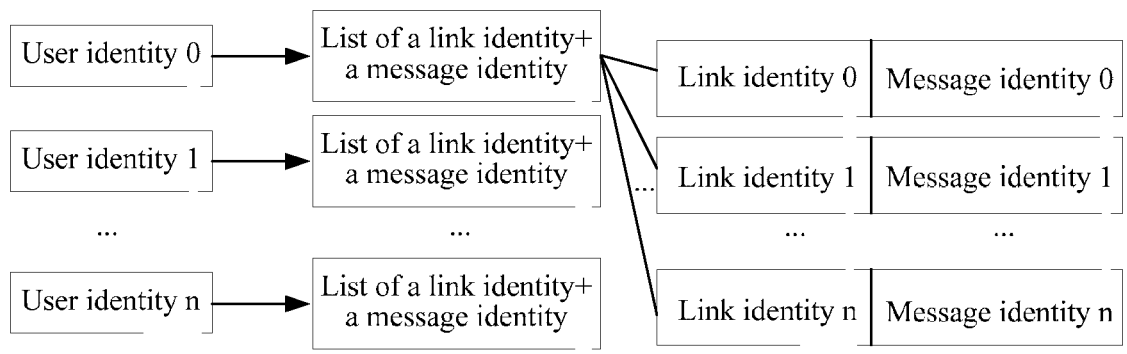
FIG. 2 is a schematic diagram showing that a data retrieval system stores data in example 1.
Figure 3:
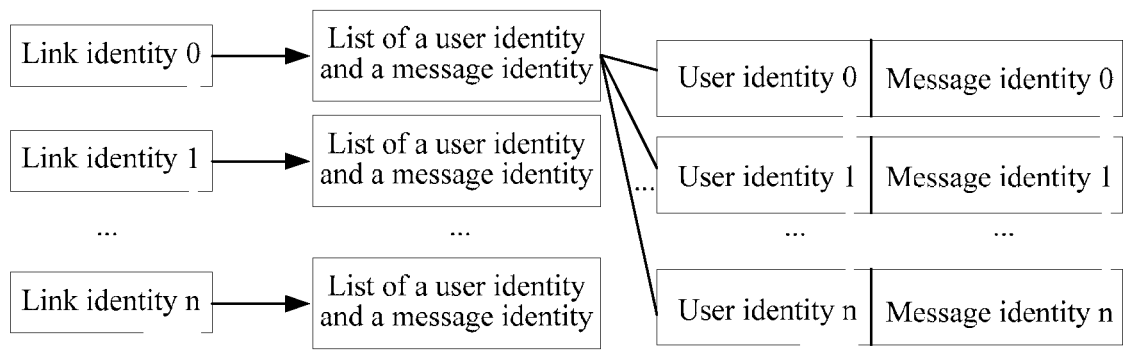
FIG. 3 is a schematic diagram showing that a data retrieval system stores data in example 2.

It is noted that compared with the foregoing example 1, a retrieval method used by the data retrieval system in example 2 is similar. A similarity is that the final result may be directly found from the correspondence list. A difference is that in the foregoing example 1, a data structure stored by the data retrieval system is an inverted data structure of correspondence from the user identity to the link identity and the message identity. As specifically shown in FIG. 2, the corresponding message identity may be found by using the user identity in this way. In example 2, a data structure stored by the data retrieval system is an inverted data structure of correspondence from the link identity to the user identity and the message identity. As specifically shown in FIG. 3, the corresponding message identity may be found by using the link identity in this way. Because the number of articles shared by a user is smaller than the number of users of an article that is shared, data of a link identity and a message identity that are corresponding to a user identity is much less than data of a user identity and a message identity that are corresponding to the link identity. In general, almost all the data of the link identity and the message identity that are corresponding to the user identity may be stored by using only a 4 kb data block. Therefore, by using the method in example 1, data volume stored in the data retrieval system is small.

Figure 4:
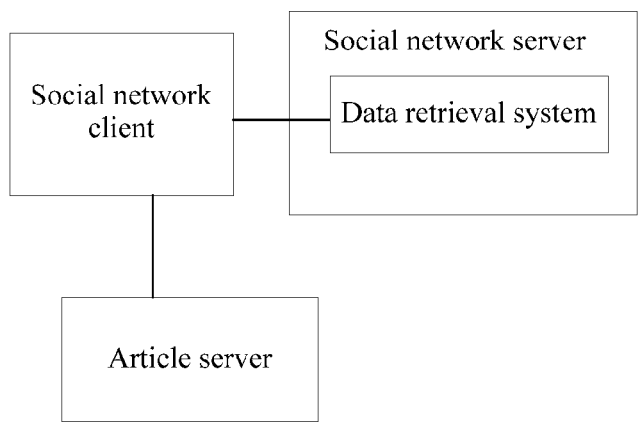
FIG. 4 is a schematic structural diagram of a social network system of a data retrieval method according to an embodiment of this application.

As an example, the following describes the data retrieval system according to example 1 by using a specific embodiment with reference to FIG. 4. As shown in FIG. 4, a social network system of this embodiment includes a social network client and a social network server. The data retrieval system is loaded in the social network server.

(1) A user initiates a data retrieval procedure of this embodiment by using the social network client.

Specifically, the user may input a keyword on an article search interface displayed by the social network client and click to submit, and the social network client sends an article search request to an article server. In this way, the article server may search for related information about the article according to the keyword, and sends link information of the article to the social network client to performing displaying.

In this way, the user may select one or more links, may select a user identity of the user, or another user identity related to the user, and submit. In this way, the social network client sends the data retrieval request to the social network server, and the method according to example 1 is performed by the data retrieval system in the social network server.

The article server is a server supported by the social network system.

(2) The data retrieval system receives the data retrieval request. For example, a user identity included in the data retrieval request is uin1, and a link identity included in the data retrieval request is docid1.

Figure 5:
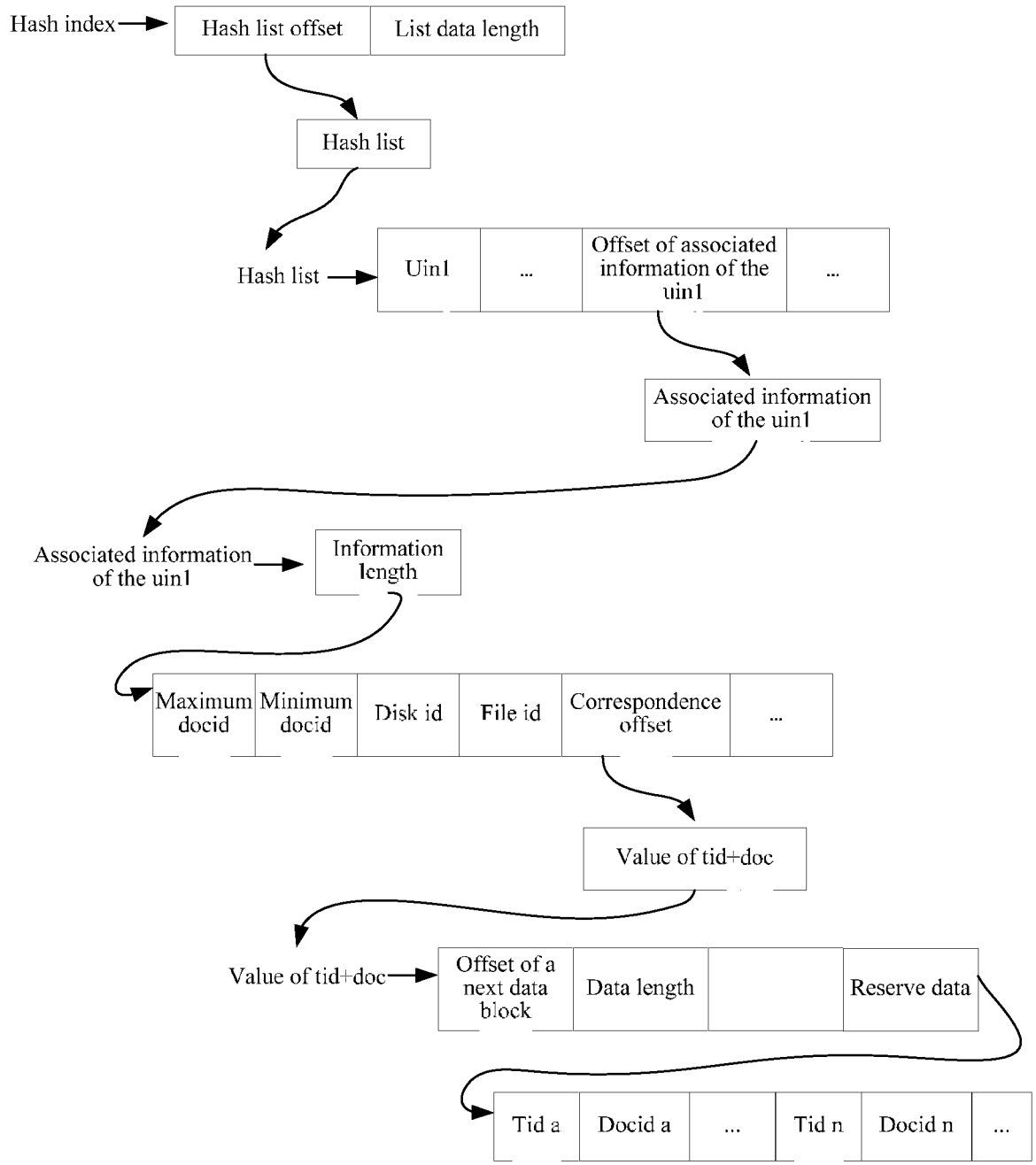
FIG. 5 is a schematic diagram of applying a data retrieval method according to an embodiment of this application.

Referring to FIG. 5, the data retrieval system finds a hash bucket that the uin1 belongs to, namely a hash index, and determines a position at which a hash list locates according to a hash list offset in the hash index; finds the hash list, and determines a position of information of a link identity associated with the uin1 according to an offset of associated information of the uin1 in the hash list; finds the information associated with the uin1, specifically including a maximum docid, a minimum docid, a disk id and a file id located by the link identity, a correspondence offset, and so on.

If the foregoing docid1 is in a range from the maximum docid to the minimum docid, and matches the dicid1 in the information of the link identity associated with the uin1, the data retrieval system determines that the dicid1 is in a range of a link identity corresponding to the uin1. That is, if the link identity docid1 is included in the link identity corresponding to the user identity uni1, determine that the link identity is corresponding to the user identity. Then determine a position of a value of a first correspondence of a link identity and a message identity according to a correspondence offset, and then find the value of the first correspondence, that is a value of tid+doc, according to the position; and retrieve a value of a tid corresponding to the docid1 from the value of the tid+doc. Certainly, a person skilled in the art should understand that if the user identity uni1 is included in a user identity corresponding to the link identity docid1, it may be determined that the link identity is corresponding to the user identity.

(3) The data retrieval system may send a final value of the tid to the article server, the article server obtains user sharing information about a corresponding article according to the value of the tid, and sends the user sharing information to the social network client to perform displaying.

Figure 6:
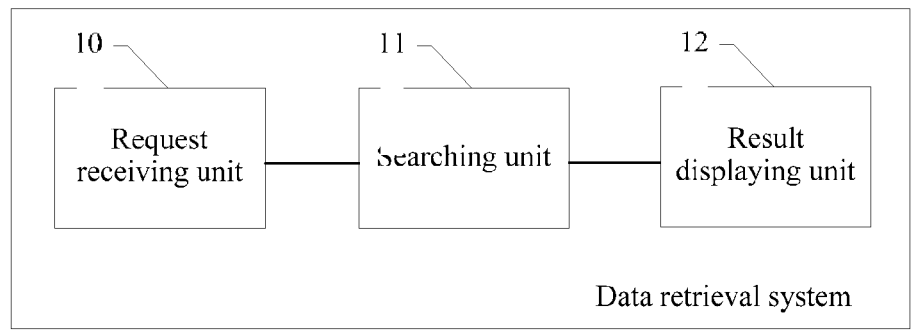
FIG. 6 is a schematic structural diagram of a data retrieval system according to an embodiment of this application.

This application further provides a data retrieval system. The system is configured to perform the method in the foregoing embodiments. A schematic structural diagram of the system is as shown in FIG. 6. The system may specifically include:

a request receiving unit 10, configured to receive a data retrieval request, the data retrieval request including a user identity and a link identity. The number of user identities and link identities in the data retrieval request may respectively be one, or respectively be plurality.

a searching unit 11, configured to search for a corresponding message identity in a preset correspondence list, if determining that the link identity is corresponding to the user identity.

According to another aspect of the present disclosure, the searching unit 11 may perform a search operation based on the correspondence list that represents the correspondence of the link identity and the message identity as described in example 1 in the foregoing embodiment or the correspondence list that represents the correspondence of the user identity and the message identity as described in example 2 in the foregoing embodiment. For example, if determining that the link identity included in the data retrieval request received by the request receiving unit 10 is in a link identity corresponding to the user identity included in the data retrieval request, the searching unit 11 searches for a message identity corresponding to the link identity in the request in a preset first correspondence list that represents the correspondence of the link identity and the message identity. For another example, if determining that the user identity included in the data retrieval request received by the request receiving unit 10 is in a range of a user identity corresponding to the link identity in the data retrieval request, the searching unit 11 searches for a message identity corresponding to the user identity in the request in a preset second correspondence list that represents the correspondence of the user identity and the message identity.

a result displaying unit 12, configured to display, according to the message identity searched for by the searching unit 11, user sharing information about a corresponding article.

It can be learned that in the data retrieval system in this embodiment, correspondence of the link identity or the user identity and the message identity is stored by using the correspondence list. In this way, when determining that the link identity and the user identity in the data retrieval request are corresponding to each other, the searching unit 11 directly finds the message identity corresponding to the link identity or the user identity in the correspondence list, thereby obtaining a situation where a user shares the article. In the system in this application, an intersection operation may be not performed, and a final result may be directly searched for and obtained. Compared with the intersection operation in the related technology, the calculation amount of data retrieval is less.

Figure 7:
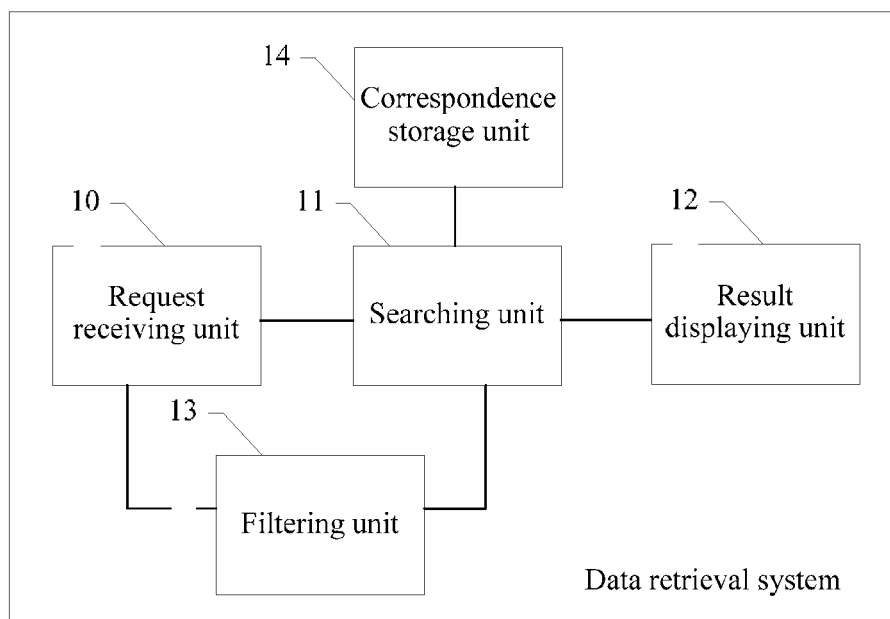
FIG. 7 is a schematic structural diagram of another data retrieval system according to an embodiment of this application.

Referring to FIG. 7, in a specific embodiment, the data retrieval system may further include a filtering unit 13 and a correspondence storage unit 14, except including the structure as shown in FIG. 6.

When the data retrieval request received by the request receiving unit 10 includes a plurality of user identities, the filtering unit 13 is configured to use a filter to filter at least one user identity in the plurality of user identities to obtain a remaining user identity. The filtered user identity is a user identity that is not corresponding to any link identity. In this way, if determining that the link identity included in the data retrieval request is in a range of a link identity corresponding to the remaining user identity obtained by filtering by the filtering unit 13, the searching unit 11 searches for the message identity corresponding to the link identity in the preset first correspondence list, which reduces a workload of data retrieval. Alternatively, if determining that the remaining user identity obtained by filtering by the filtering unit 13 is in a range of the user identity corresponding to the link identity, the searching unit 11 searches for the message identity corresponding to the user identity in the preset second correspondence list, which reduces a workload of data retrieval.

The correspondence storage unit 14 is configured to receive a sharing request of a user for an article of a link. The sharing request includes a link identity of the link and a user identity of the user. The correspondence storage unit 14 stores information about the article of the link into a message corresponding to the user identity, generates a message identity of the message, associates the link identity with the user identity, and then stores the link identity and the message identity into the first correspondence list, or stores the user identity and the message identity into the second correspondence list. The first correspondence list includes a plurality of data blocks. Each data block includes a header and a value. The header includes a data length and offset data of a next data block in a file. The value of each data block includes a link identity and a corresponding message identity. The second correspondence list also includes a plurality of data blocks. Each data block includes a header and a value. The header includes a data length and offset data of a next data block in a file. The value of each data block includes a user identity and a corresponding message identity. In this way, the searching unit 11 finds the corresponding message identity in the first correspondence list or the second correspondence list stored by the correspondence storage unit 14.

Figure 8:
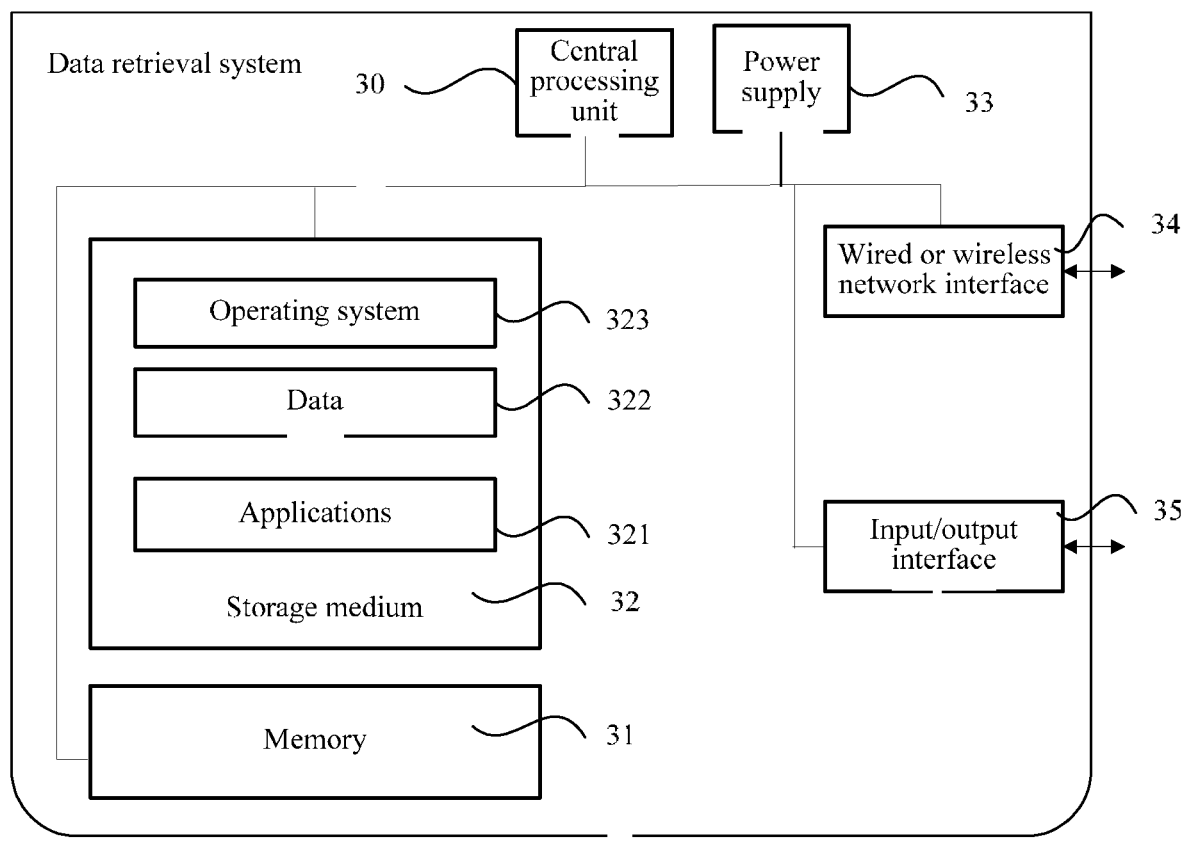
FIG. 8 is a schematic diagram of a hardware structure of a data retrieval system according to an embodiment of this application.

This application further provides a data retrieval system. A schematic structural diagram of the system is as shown in FIG. 8. The data retrieval system may vary greatly due to different configurations or performance, and may include one or more processors 30 (for example, one or more central processing units (CPU)) and a memory 31, and one or more storage media 32 (for example, one or more mass storage devices) that store applications 321 or data 322. The memory 31 and the storage medium 32 may be transient or persistent storages. The program stored in the storage medium 32 may include one or more modules (not shown in the figure), and each module may include a series of instructions and operations for implementing the method according to this application. Still further, the processor 30 may be configured to communicate with the storage medium 32, and perform, on the data retrieval system, a series of instructions and operations in the storage medium 32.

The data retrieval system may further include one or more power supplies 33, one or more wired or wireless network interfaces 34, one or more input/output interfaces 35, and/or one or more operating systems 323, for example, Windows Server™, Mac OS X™, Unix™, Linux™, or FreeBSD™.

Steps performed by the data retrieval system according to the foregoing embodiments may be based on the structure of the data retrieval system shown in FIG. 8.

A person of ordinary skill in the art should understand that all or part of the steps in various methods of the foregoing embodiments may be implemented by a program instructing relevant hardware. The program may be stored in a computer readable storage medium. The storage medium may include a read only memory (ROM), a random access memory (RAM), a magnetic disk or an optical disk or the like.

The data retrieval method and system provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person of ordinary skill in the art may make modifications to the specific implementations and application range according to the idea of this application. In conclusion, the content of this specification should not be construed as a limit on this application.

What is claimed is:

1. A method for data retrieval, comprising:
   receiving, by interface circuitry of an information processing apparatus, a request for data retrieval from a database that stores content sharing information in a social network, the request comprising a first link identifier of a plurality of link identifiers and a plurality of user identifiers including a first user identifier, each of the plurality of link identifiers including information that associates a link with an article;
   using, from a filter file, filters corresponding to the plurality of link identifiers to filter out a subset of user identifiers from the plurality of user identifiers, the subset of user identifiers not being associated with one or more of the plurality of link identifiers in the database;
   determining, by processing circuitry of the information processing apparatus, whether the first user identifier is associated with the one or more of the plurality of link identifiers in the database based on remaining link identifiers that are not filtered out by the filter;
   when the first user identifier is determined to be associated with the one or more of the plurality of link identifiers in the database, determining, by the processing circuitry of the information processing apparatus, whether the first user identifier and the first link identifier are associated in the database as a consequence of a previous sharing of a first article corresponding to the first link identifier using the first user identifier;
   searching for a first message identifier in the database when the first user identifier and the first link identifier are determined to be associated in the database, the first message identifier identifying a first message that includes information of the previous sharing of the first article corresponding to the first link identifier using the first user identifier; and
   retrieving the first message according to the first message identifier.

2. The method according to claim 1, wherein the searching for the first message identifier in the database when the first user identifier and the first link identifier are determined to be associated in the database further comprises:
   searching for the first message identifier when the first user identifier is not in the subset of user identifiers that has been filtered out.

3. The method according to claim 1, wherein the filter in the filter file includes a filter index field and a filter value field, the filter index field includes a corresponding link identifier to the filter and an offset of the filter in the filter file, and the filter value field includes a plurality of data blocks that respectively include a data length and filtering policy data.

4. The method according to claim 1, further comprising:
   receiving a sharing request to share a second article that is identified by a second link identifier, the sharing request including a second user identifier that is used by a user who sends the sharing request; and
   storing information of a sharing of the second article using the second user identifier in a second message, the second article being identified by the second link identifier in the second message;
   generating a second message identifier for identifying the second message;
   associating the second link identifier with the second user identifier; and
   storing the second ink identifier in association with the second message identifier m the database.

5. The method according to claim 1, further comprising:
   receiving a sharing request to share a second article that is identified by a second link identifier, the sharing request including a second user identifier that is used by a user who sends the sharing request; and
   storing information of a sharing of the second article using the second user identifier in a second message, the second article being identified by the second link identifier in the second message;
generating a second message identifier for identifying the second message;
associating the second link identifier with the second user identifier; and
storing the second link identifier in association with the second message identifier in the database.

6. The method according to claim 2, further comprising:
receiving a sharing request to share a second article that is identified by a second link identifier, the sharing request including a second user identifier that is used by a user who sends the sharing request; and
storing information of a sharing of the second article using the second user identifier in a second message, the second article being identified by the second link identifier in the second message;
generating a second message identifier for identifying the second message;
associating the second link identifier with the second user identifier; and
storing the second link identifier in association with the second message identifier in the database.

7. The method according to claim 1, further comprising:
receiving a sharing request to share a second article that is identified by a second link identifier, the sharing request including a second user identifier that is used by a user who sends the sharing request; and
storing information of a sharing of the second article using the second user identifier in a second message, the second article being identified by the second link identifier in the second message;
generating a second message identifier for identifying the second message;
associating the second link identifier with the second user identifier; and
storing the second user identifier in association with the second message identifier in the database.

8. The method according to claim 1, further comprising:
receiving a sharing request to share a second article that is identified by a second link identifier, the sharing request including a second user identifier that is used by a user who sends the sharing request; and
storing information of a sharing of the second article using the second user identifier in a second message, the second article being identified by the second link identifier in the second message;
generating a second message identifier for identifying the second message;
associating the second link identifier with the second user identifier; and
storing the second user identifier in association with the second message identifier in the database.

9. The method according to claim 2, further comprising:
receiving a sharing request to share a second article that is identified by a second link identifier, the sharing request including a second user identifier that is used by a user who sends the sharing request; and
storing information of a sharing of the second article using the second user identifier in a second message, the second article being identified by the second link identifier in the second message;
generating a second message identifier for identifying the second message;
associating the second link identifier with the second user identifier; and
storing the second user identifier in association with the second message identifier in the database.

10. An apparatus for data retrieval, comprising:
memory circuitry configured to store a database that stores content sharing information in a social network;
interface circuitry configured to receive a request for data retrieval from the database, the request comprising a first link identifier of a plurality of link identifiers and a plurality of user identifiers including a first user identifier, each of the plurality of link identifiers including information that associates a link with an article;
processing circuitry configured to:
use, from a filter file, filters corresponding to the plurality of link identifiers to filter out a subset of user identifiers from the plurality of user identifiers, the subset of user identifiers not being associated with one or more of the plurality of link identifiers in the database;
determine whether the first user identifier is associated with the one or more of the plurality of link identifiers in the database based on remaining link identifiers that are not filtered out by the filter;
when the first user identifier is determined to be associated with the one or more of the plurality of link identifiers in the database, determine whether the first user identifier and the first link identifier are associated in the database as a consequence of a previous sharing of a first article corresponding to the first link identifier using the first user identifier;
search for a first message identifier in the database when the first user identifier and the first link identifier are determined to be associated in the database, the first message identifier identifying a first message that includes information of the previous sharing of the first article corresponding to the first link identifier using the first user identifier; and
retrieve the first message according to the first message identifier.

11. The apparatus according to claim 10, wherein the processing circuitry is configured to:
search for the first message identifier when the first user identifier is not in the subset of user identifiers that has been filtered out.

12. The apparatus according to claim 10, wherein the filter in the filter file includes a filter index field and a filter value field, the filter index field includes a corresponding link identifier to the filter and an offset of the filter in the filter file, and the filter value includes a plurality of data blocks that respectively include a data length and filtering policy data.

13. The apparatus according to claim 10, wherein
the interface circuitry is configured to receive a sharing request by a second user identifier to share a second article that is identified by a second link identifier; and
the processing circuitry is configured to:
store information of a sharing, by the second user identifier, of the second article that is identified by the second link identifier in a second message;
generate a second message identifier for identifying the second message;
associate the second link identifier with the second user identifier; and
store the second link identifier in association with the second message identifier in the database.

14. The apparatus according to claim 10, wherein:
the interface circuitry is configured to receive a sharing request to share a second article that is identified by a second link identifier, the sharing request including a
second user identifier that is used by a user who sends
the sharing request; and the processing circuitry is configured to:
  store information of a sharing of the second article
    using the second user identifier in a second message,
    the second article being identified by the second link
    identifier in the second message;
  generate a second message identifier for identifying the
    second message;
  associate the second link identifier with the second user
    identifier; and
  store the second link identifier in association with the
    second message identifier in the database.

15. The apparatus according to claim 11, wherein:

the interface circuitry is configured to receive a sharing request to share a second article that is identified by a second link identifier, the sharing request including a second user identifier that is used by a user who sends the sharing request; and the processing circuitry is configured to:
  store information of a sharing of the second article using the second user identifier in a second message, the second article being identified by the second link identifier in the second message;
  generate a second message identifier for identifying the second message;
  associate the second link identifier with the second user identifier; and
  store the second link identifier in association with the second message identifier in the database.

16. The apparatus according to claim 10, wherein:

the interface circuitry is configured to receive a sharing request to share a second article that is identified by a second link identifier, the sharing request including a second user identifier that is used by a user who sends the sharing request; and the processing circuitry is configured to:
  store information of a sharing of the second article using the second user identifier in a second message, the second article being identified by the second link identifier in the second message;
  generate a second message identifier for identifying the second message;
  associate the second link identifier with the second user identifier; and
  store the second user identifier in association with the second message identifier in the database.

17. The apparatus according to claim 10, wherein:

the interface circuitry is configured to receive a sharing request to share a second article that is identified by a second link identifier, the sharing request including a second user identifier that is used by a user who sends the sharing request; and the processing circuitry is configured to:
  store information of a sharing of the second article using the second user identifier in a second message, the second article being identified by the second link identifier in the second message;
  generate a second message identifier for identifying the second message;
  associate the second link identifier with the second user identifier; and
  store the second user identifier in association with the second message identifier in the database.

18. The apparatus according to claim 11, wherein:

the interface circuitry is configured to receive a sharing request to share a second article that is identified by a second link identifier, the sharing request including a second user identifier that is used by a user who sends the sharing request; and the processing circuitry is configured to:
  store information of a sharing of the second article using the second user identifier in a second message, the second article being identified by the second link identifier in the second message;
  generate a second message identifier for identifying the second message;
  associate the second link identifier with the second user identifier; and
  store the second user identifier in association with the second message identifier in the database.

\* \* \* \* \*